R. L. INGRAM.
COTTON CHOPPER.
APPLICATION FILED MAY 10, 1919.
1,325,566.
Patented Dec. 23, 1919.
2 SHEETS—SHEET 2.
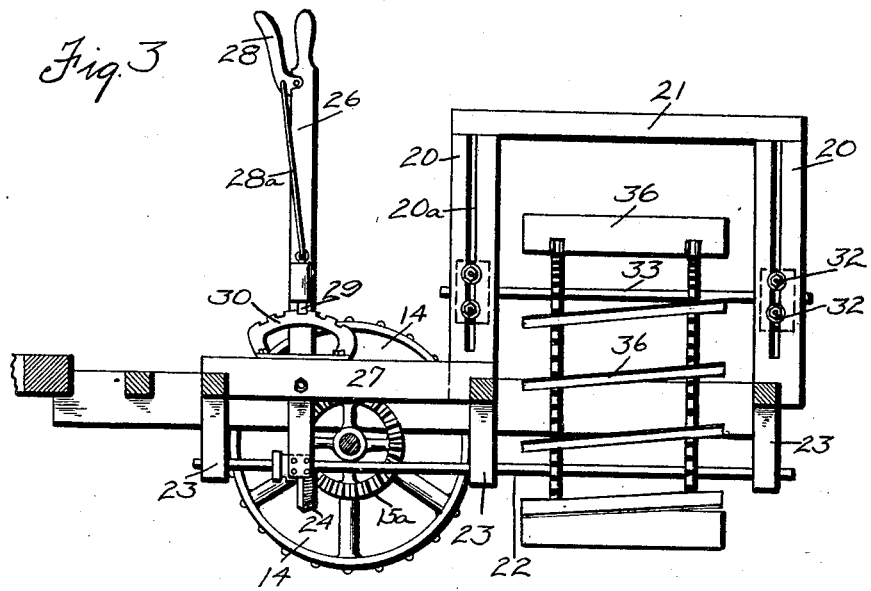
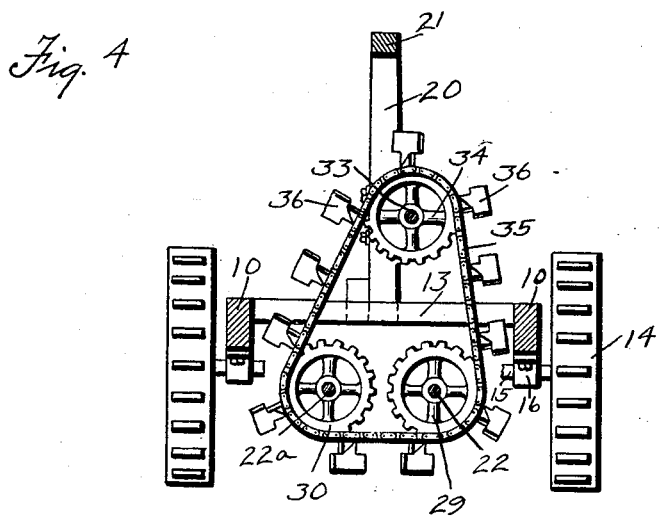
WITNESSES
INVENTOR
R. L. INGRAM
BY
ATTORNEYS

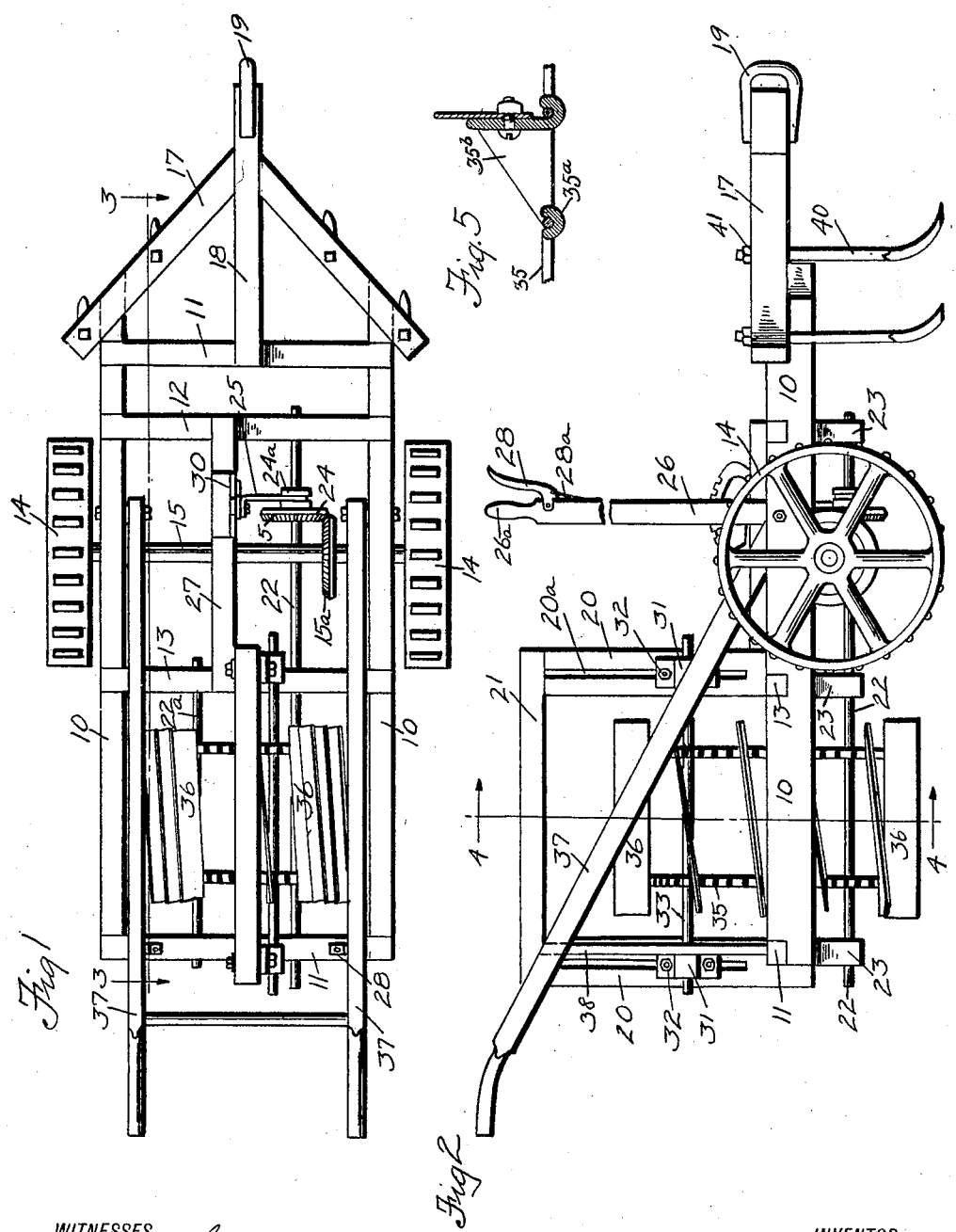

UNITED STATES PATENT OFFICE.

ROBERT L. INGRAM, OF LILESVILLE, NORTH CAROLINA.

COTTON-CHOPPER.

1,325,566.   Specification of Letters Patent.   Patented Dec. 23, 1919.

Application filed May 10, 1919. Serial No. 296,054.

*To all whom it may concern:*

Be it known that I, ROBERT L. INGRAM, a citizen of the United States, and a resident of Lilesville, in the county of Anson and State of North Carolina, have invented certain new and useful Improvements in Cotton-Choppers, of which the following is a specification.

My invention relates to improvements in cotton choppers adapted for use in chopping out superfluous plants in the cotton drills and reducing the same to stands, and has for an object to provide a device that is simple, durable and efficient in operation.

With this and other objects in view, the invention consists in certain novel features of construction, combination and arrangement of parts as will be hereinafter more fully described and pointed out in the claims, reference being had to the accompanying drawing in which:

Figure 1 is a top plan view of my device,

Fig. 2 is a side elevation of the same,

Fig. 3 is a vertical longitudinal sectional view taken on the line 3—3 of Fig. 1, Fig. 4 is a vertical transverse section taken on the line 4—4 of Fig. 2, Fig. 5 is a sectional detail view showing one of the sprocket chains and the links to which the chopping hoe is applied.

In carrying out my invention, I use a main frame consisting of side bars 10, end bars 11, and two or more intermediate cross bars 12 and 13. The frame is mounted on drive wheels 14 mounted on the axle 15 which is carried in bearings 16 rigidly secured to the side bars 10, these wheels 14 having corrugated or roughened tires so that traction can easily take place. At the front of the frame is mounted a harrow frame which is triangular in shape, consisting of the converging side bars 17 mounted on the side bars 10 adjacent to the front end bar 11, and a central beam 18 extending through the apex of the triangle at the front and having secured at its front end a clevis 10 to which a single or double team is to be attached.

To the rear of the drive wheels a vertical or upstanding frame is secured to the main frame and consists of front and rear standards 20, and a top cross beam 21, and the lower ends of the front and rear standards 20 are rigidly secured to the cross bar 13 and end bar 11, respectively.

A longitudinally disposed shaft 22 is supported below the main frame by bearings 23 suspended from the cross bars 12, 13, and 11, and on this shaft is slidably mounted a bevel gear 24 having an integral grooved collar 24$^a$ which is also slidably mounted on said shaft; engaging in the groove of the collar is a forked arm 25 of a lever 26 pivoted to a longitudinally disposed short beam 27 extending from the cross beam 12 of the cross beam 13. The lever 26 has a handle 26$^a$ at its upper end and is provided with the usual hand grip 28 pivoted to the lever 26 and a rod 28$^a$ extending down and connected to spring bolt 29 which engages a quadrant rack 30, secured to the beam 27 for the purpose of moving the bevel gear 24 forwardly or rearwardly on the shaft 22.

On the axle 15 of the drive wheels, a somewhat larger bevel gear 15$^a$ is rigidly mounted, so that it rotates with the axle 14 when the apparatus is pushed or drawn along, and this gear is designed to be engaged by the bevel gear 24 when it is moved rearwardly by means of the hand lever.

The shaft 22 which is a driving shaft, extends as before set forth, to the rear of the main frame, being supported at the rear portion in the bearings 23. On the shaft 22 and between the rear pair of bearings 23 are rigidly secured sprocket wheels 29 spaced from each other and suspended beneath the frame at the opposite side of the longitudinal center is a counter shaft 22$^a$, mounted in suitable bearings; on the counter shaft are rigidly secured a pair of spaced apart sprocket wheels 30 the same size as the sprocket wheels 29 and in lateral alinement therewith.

The uprights 20 are slotted as seen at 20$^a$, and slidably secured to one face of the uprights are bearing blocks 31 which may be adjusted vertically by means of bolts 32 which pass through the slots 20$^a$; in the bearing blocks 31 is mounted another countershaft 33 having rigidly secured thereon the sprocket wheels 34, similarly spaced apart as the sprocket wheels on shafts. Running over the sprocket wheels mentioned, are the link chains 35 and suitably secured to the pairs of sprocket chains are the chopping hoes 36 which are disposed at slight angles from the horizontal. Each hoe is twisted out of its normal flat plane at the front and rear edges and secured to attaching links 35ª having angular end walls 35ᵇ, as shown in Fig. 5.

Handles 37 are provided for guiding the device and to aid in forcing the same along, said handles being bolted to the side beams adjacent the axle 14, and the handles are held rigidly in place by the braces 38.

The triangular frame at the front carries harrow blades. Any suitable number of chopping hoes may be used and as they are suitably spaced apart, it is believed to be obvious, that when the machine is moving forwardly that the chopping hoes run transversely with reference to and across the cotton drills, the machine being moved in line with the drills, so that the chopping hoes are carried to chop out and destroy the superfluous plants in the drill and reduce them to stands suitably spaced apart. By vertical adjustment of the shafts carrying the sprocket wheels, the chopping hoes may be caused to run and operate at any required depth across the drills.

From the foregoing description it is thought the construction and operation of the device may be readily understood without further explanation, it being understood that motion is given to the hoes through the drive wheels by means of the bevel gears, shafts and countershafts, sprocket gears and sprocket chains.

The harrow frame at the front is to carry the side harrows 40 which are to be of suitable size, and may be detached from the frame.

I claim:—

1. A cotton chopper, comprising a main frame, an axle, drive wheels carried thereon, and a supplemental hoe carrying frame on the rear of the main frame, a longitudinally disposed drive shaft mounted in the main frame at one side of its longitudinal center, a shiftable gear mounted on said shaft, a gear carried by the aforesaid axle, a counter shaft disposed laterally of said drive shaft and below the main frame, spaced apart sprocket wheels mounted on said drive shaft and counter-shaft, a second counter shaft adjustably mounted in the hoe carrying frame above the main frame, spaced apart sprocket wheels carried by said last mentioned counter shaft, spaced apart flexible sprocket chains engaging all of the sprocket wheels, and chopping hoes secured at their ends to said spaced-apart flexible chains.

2. A cotton chopper comprising a main frame, a transverse axle mounted therein, and traction wheels carried by said axle, a hoe carrying frame mounted on said main frame to the rear of said axle and extending above and below the main frame, a main drive shaft mounted longitudinally of said main frame at one side of its longitudinal axis, a driving gear mounted on said axle, a driven gear slidably mounted on said main drive shaft, a counter-shaft mounted in said frame laterally of the main drive shaft and disposed beneath the hoe carrying frame, a pair of spaced apart sprocket wheels mounted on said drive and counter shafts, a second counter shaft mounted in the hoe carrying frame, bearing blocks adjustably supporting the last mentioned counter shaft with respect to the hoe frame, a pair of spaced apart sprocket wheels mounted on the last mentioned counter-shaft, endless and flexible sprocket chains engaging said sprocket wheels, and chopping hoes connected at opposite ends of the aforesaid sprocket chains at an angle thereto, the cutting edge of said hoes deflected in opposite directions at the opposite ends.

ROBERT L. INGRAM.

Witnesses:
BEN R. WALL,
BOYD B. MANOGU.